Nov. 29, 1966     K. L. CARR     3,289,111
FERRITE DEVICE UTILIZING THE SHORTED TURN
EFFECT, WITH ELECTROMAGNET WINDING
INSIDE WAVEGUIDE AND ADJACENT
TO FERRITE MATERIAL
Filed March 4, 1964

INVENTOR.
KENNETH L. CARR
BY
Weingarten, Ovenbuch & Pandiscio
ATTORNEYS

United States Patent Office 3,289,111
Patented Nov. 29, 1966

3,289,111
FERRITE DEVICE UTILIZING THE SHORTED
TURN EFFECT, WITH ELECTROMAGNET
WINDING INSIDE WAVEGUIDE AND ADJACENT TO FERRITE MATERIAL
Kenneth L. Carr, Bedford, Mass., assignor to Ferrotec, Inc., Newton, Mass., a corporation of Massachusetts
Filed Mar. 4, 1964, Ser. No. 349,334
4 Claims. (Cl. 333—24.2)

This invention relates in general to microwave devices and more particularly to devices, bounded by electrically conductive walls, utilizing an internal magnetic field whose direction or intensity is variable.

The invention is applicable, broadly, to any waveguide device, having electrically conductive walls, which employs a localized internal magnetic field, and the invention is especially useful where that internal field must be varied in intensity or direction. The invention, inter alia, is utilized in waveguide devices generally known as "Faraday rotators" because of their ability to rotate the plane of polarization of electromagnetic waves propagating through a ferrite situated in a magnetic field within the waveguide.

It is well known that a Faraday rotator can be used as a switch by reversing the magnetic field in which the ferrite is situated. Reversing the magnetic field causes a reversal in the direction of rotation of the electromagnetic wave energy brought about by the ferrite. Where, for example, an established magnetic field causes a clockwise rotation of electromagnetic wave energy propagating through the waveguide device, a reversal of the magnetic field results in a counterclockwise rotation of the propagating wave energy. Establishment of the magnetic field in the conventional Faraday rotator is accomplished by employing an electromagnetic coil wound around the exterior of the waveguide, the waveguide usually being a hollow cylinder. Energization of the electromagnet by a direct current (D.C.) determines the clockwise or counterclockwise Faraday rotation effect of the ferrite in the waveguide. By reversing the direction of flow of the direct current applied to the electromagnet, the direction of the established magnetic field is reversed.

High speed switching in devices such as the Faraday rotator has, however, been a problem to which great consideration has been given. A serious obstacle to high speed switching is the "shorted turn effect" caused by the conductive wall of the metallic waveguide acting as a shorted secondary winding of a transformer. To minimize the shorted turn effect, solutions have been tried such as constructing the waveguide of a non-conducting material upon which a thin metal film has been deposited or employing a metallic waveguide having a longitudinal slot bridged by a radio-frequency choke.

Rather than minimize the shorted turn effect, the invention utilizes that effect to aid in switching the device. The invention is directed to a waveguide device permitting fast switching of the internal magnetic field without seriously disturbing the transmission path through the waveguide. In the invention, the electromagnetic apparatus for establishing the magnetic field is arranged within the waveguide so that the shorted turn is driven to aid in switching the magnetic field in the device.

The arrangement and mode of operation of the invention can be more fully understood from the exposition which follows when it is considered in conjunction with the accompanying drawings in which.

Fast switching of a waveguide device employing an internally disposed ferrite is basically a problem of causing a change in the magnetic field extending through the ferrite without seriously disturbing the transmission path taken by wave energy propagating in the guide. In the case of the conventional Faraday rotator, depicted in FIG. 1, an electromagnetic coil or solenoid 1 is externally wound around a metallic cylindrical waveguide 2 in which a ferrite rod 3 is centrally disposed. By applying a direct current (D.C.) to the solenoid a magnetic field is established that extends into the waveguide and through the ferrite rod 3. Upon energization of the solenoid, the magnetic field that is created passes through the metal wall of waveguide 2 (usually constructed of a non-magnetic material such as copper, aluminum, or brass), and in doing so induces eddy currents in the metal wall which in turn produce a magnetic field that opposes the magnetic field of the solenoid. Thus, as the magnetic field of the solenoid attempts to build up in intensity, it is opposed by the magnetic field of the eddy currents in the metal wall of the waveguide. As a corollary, when the magnetic field of the solenoid decreases in intensity, the decrease is opposed by the magnetic field set up by eddy currents in the metal wall of the waveguide. Any change, therefore, in the intensity of the solenoid's magnetic field is opposed by the magnetic field of the induced currents. This phenomenon is known as the "shorted turn effect" and it seriously impairs the rate at which the magnetic field extending through the ferrite can be changed.

Figure 1:
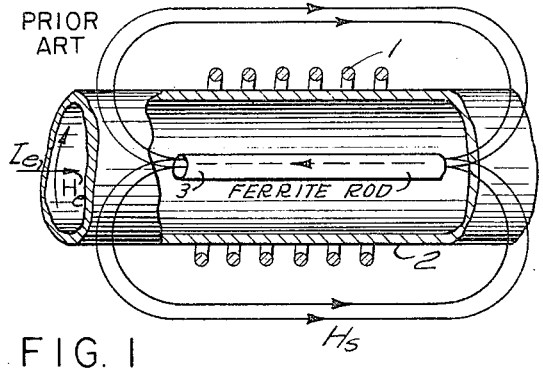
FIG. 1 depicts a conventional wave guide device of the type utilizing a longitudinal internal magnetic field and illustrates the manner in which the shorted turn effect creates an opposing internal magnetic field.

In FIG. 1, lines of magnetic flux are shown which are set up by the direct current flowing in the solenoid. Ferrite rod 3 is located along the longitudinal axis of the solenoid so that the magnetic flux lines concentrate at and extend through the ferrite. The magnetic field $H_s$ established by the solenoid is due to a direct current and the assumed direction of the magnetic field is indicated by arrowheads on the flux lines. When current first begins to flow in the solenoid, a magnetic field arises that passes through the wall of the waveguide and induces eddy currents tending to circulate around the wall in the direction indicated by the $I_e$ arrow. The eddy currents, in turn, give rise to a magnetic field $He$ whose flux at the center of the waveguide is in the direction of the He arrow. It is readily apparent that the magnetic field $He$ due to the eddy currents opposes the magnetic field $Hs$ of the solenoid. Because of the opposition offered by the "shorted turn effect," the rate at which the magnetic field of the solenoid can change is seriously limited.

Figure 2:
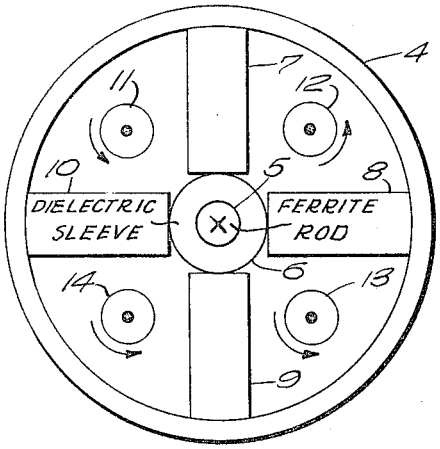
FIGS. 2 and 3 depict an embodiment of the invention employing an internal longitudinal magnetic field established in a manner utilizing the shorted turn effect to advantage.
Figure 3:
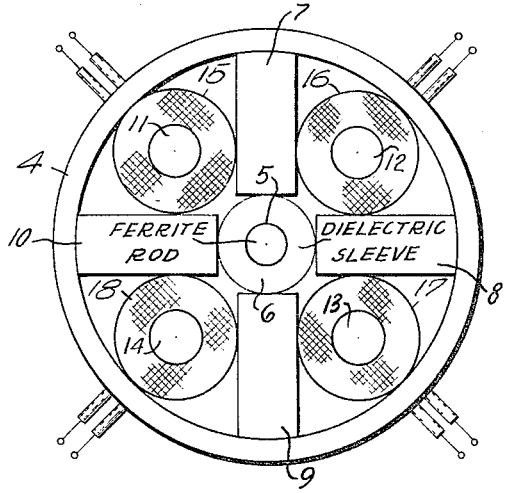

FIG. 2 shows the scheme of a ferrite device in which the shorted turn effect is utilized to advantage in accordance with the concept of the invention. An internally ridged circular waveguide such as the quadruply ridged circular waveguide 4 is employed. A ferrite rod 5 is disposed longitudinally along the axis of the circular waveguide and is supported in this position by a dielectric sleeve 6 held between the ends of internal ridges 7, 8, 9, and 10. Due to the nature of the ridged waveguide, it is known that the electric field of the wave energy propagating through the guide is concentrated between the ends of the ridges, and the fringes of the magnetic field of the propagating wave energy extend into the sectors between the sides of the ridges. Four rods 11, 12, 13, 14 are disposed in the sectors and serve as the cores of electromagnets having coils 15, 16, 17, 18. As shown in FIG. 3, the coils are mounted on their respective cores and abut the internal wall of the waveguide 4. Because the cores are affected by the fringing field extending into the sectors, the cores are preferably made of a material having both ferromagnetic and dielectric properties, such as a ferrite. Each coil has leads protruding through holes in the waveguide wall, the leads permitting an energizing potential to be applied to the coil. The leads of the four coils are energized so that the current flow in the coils is in the same rotary direction. That is, viewing the ends of the cores as in FIG. 2, the currents are either all simultaneously flowing counterclockwise or are all simultaneously flowing clockwise. Assuming the coil currents are counterclockwise as indicated by the four arrows in FIG. 2, the magnetic fields established by the four electromagnets extend through the wall of the waveguide and induce the flow of eddy currents when the magnetic fields increase or decrease in intensity. The magnetic fields of the electromagnets are now purposely intended to couple to and drive the shorted turn formed by the circular waveguide wall.

Figure 4:
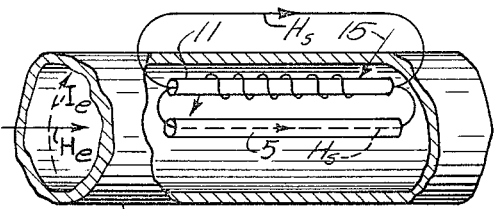
FIG. 4 is a form of the embodiment shown in FIGS. 2 and 3 which has been simplified to illustrate the principle of operation of the invention.

A simplified form of the device of FIG. 3 is depicted in FIG. 4. For simplicity, the ridges are omitted, the central ferrite rod is illustrated, and only one electromagnet constituted by the core 11 and coil 15 is shown. Assuming that current commences to flow in coil 15 in the direction indicated, the magnetic field of the electromagnet $H_s$ is established through ferrite rod 5 with the lines of flux having the directions indicated by the arrowheads. The lines of flux passing through the electrically conductive wall of the waveguide induce eddy currents which circulate around the wall in the direction of arrow $I_e$. The eddy currents cause a magnetic field $H_e$ to be established that has the same direction through the ferrite rod 5 as the field $H_s$ of the electromagnet. Consequently, the $H_e$ magnetic field of the shorted turn adds to the $H_s$ magnetic field of the electromagnet. The shorted turn effect now aids in changing the intensity of the magnetic field which extends through the central ferrite rod and therefore permits fast switching of the magnetic field.

Figure 5:
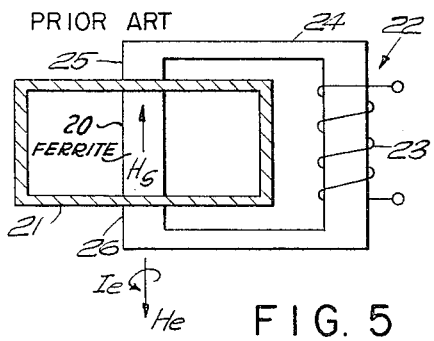
FIG. 5 shows a conventional waveguide device of the type employing a transverse internal magnetic field.

The invention is not restricted to Faraday rotators but can be used in other types of microwave devices. For example, where a Faraday rotator requires a magnetic field which extends longitudinally in the waveguide, other types of waveguide devices employ a transverse magnetic field. FIG. 5 depicts a conventional waveguide device of the type using a transverse magnetic field. A ferrite slab 20 is positioned in a hollow rectangular metallic waveguide 21 as shown in FIG. 5. To produce a magnetic field $H_s$ through the ferrite slab, an external electromagnet 22 is employed having a coil 23 and an armature 24 whose pole pieces 25, 26 rest upon the walls of the waveguide and are proximate to the ends of the ferrite slab. Assuming the direct current in coil 23 flows in a direction causing the $H_s$ magnetic field of the electromagnet to have the direction indicated by the arrow, eddy currents $I_e$ are induced in the conductive walls of the waveguide by the $H_s$ field. The eddy currents circulate in a manner causing the establishment of a magnetic field $H_e$ which is opposed to the $H_s$ magnetic field. Again, this is the "shorted turn effect" which inhibits rapid changes in the magnetic field extending through the ferrite slab.

Figure 7:
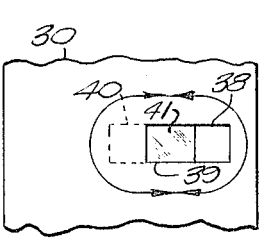
FIGS. 6 and 7 depict the invention as embodied in a device of the type employing a transverse internal magnetic field.
Figure 6:
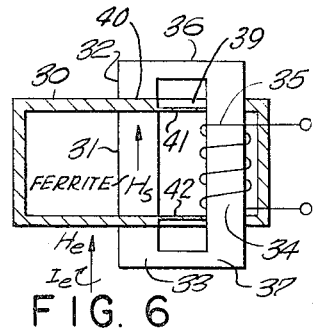

Utilization of the invention in a waveguide device of the type employing a transverse magnetic field is illustrated in FIG. 6. At the center of hollow rectangular waveguide 30 is a ferrite slab 31 which is subject to a magnetic field established between the poles 32, 33 of an electromagnet. The electromagnet is disposed in the interior of the waveguide and comprises a core 34 surrounding by a coil 35 having leads extending through apertures in the metallic waveguide wall. A pair of highly magnetically permeable members 36, 37 act as flux paths for the magnetic flux emanating from the electromagnet and cause a magnetic field concentrated at the ferrite slab to be established transversely across the waveguide. Members 36 and 37, each have one leg protruding through an aperture in the broad wall of the waveguide so that the leg is contiguous to the end of core 34 and constitutes an extension of that core. FIG. 7 is a view of the broad wall of the waveguide and illustrates the aperture 38 through which the leg protrudes. A portion 39 of the top broad wall, lying between the aperture 38 and the area 40 covered by the pole piece 32 is removed and that portion is covered by a thin metallic film 41. Similarly, a corresponding portion of the bottom broad wall is removed and covered by a thin metallic film 42. By removing those broad wall portions, the eddy currents are forced to circulate around the loop indicated in FIG. 7.

When coil 35 is energized by the flow in it of a direct current, the magnetic field of the electromagnet induces eddy currents in the waveguide's metallic walls, the net effect of which produces a magnetic field $H_e$ that aids the field $H_s$ established across the ferrite slab by the electromagnet. In order that the presence of the electromagnet within the waveguide shall not interfere materially with the transmission of wave energy through the waveguide, the effects of the presence of the electromagnet can be minimized by employing an iris or similar element in the waveguide in accordance with usually "matching" techniques.

Modifications of the embodiments of the invention depicted in the drawings may be made without departing from the essential concept of the invention and, indeed, are apparent to those skilled in the electronics art. It is intended, therefore, that the invention not be limited to the precise arrangements illustrated, but rather that the invention's scope be construed as delimited by the appended claims.

What is claimed is:

1. In a device having a waveguide bounded by an electrically conductive wall, the device being of the type utilizing a magnetic field internally of the waveguide and the waveguide having in it a ferrite situated in the internal magnetic field, the improvement of an electromagnet for establishing the internal magnetic field, the electromagnet being within the waveguide and disposed so that it is inductively coupled to the electrically conductive wall, and the ferrite being located outside of the electromagnet's winding.

2. In a ferrite device of the type having a ferrite rod extending along the longitudinal axis of a metallic waveguide, the improvement of an arrangement establishing a longitudinal magnetic field through the ferrite rod in which the shorted turn effect of the metallic waveguide aids that magnetic field, the improvement comprising an electromagnet disposed inside the waveguide, the electromagnet being adjacent the metal wall of the waveguide so that it is inductively coupled to the metal wall, the ferrite rod being located outside of the electromagnet's winding, and the electromagnet being substantially coextensive with the length of the ferrite rod and oriented to establish a longitudinal magnetic field through the ferrite rod.

3. In a ferrite device of the type having a ferrite rod extending along the longitudinal axis of a metallic waveguide, the improvement of an arrangement establishing a longitudinal magnetic field through the ferrite rod in which the shorted turn effect of the metallic waveguide aids that magnetic field, the improvement comprising a hollow waveguide, having internally extending ridges, means for supporting the ferrite rod between the ridges, and at least one electromagnet disposed inside the waveguide adjacent the metal wall of the waveguide so that the electromagnet couples by induction to the metal wall, the ferrite rod being outside of the electromagnet's winding and the electromagnet being oriented to establish a longitudinal magnetic field through the ferrite rod.

4. In a ferrite device of the type utilizing a ferrite rod extending along the longitudinal axis of a circular metallic waveguide, the improvement of an arrangement establishing a longitudinal magnetic field through the ferrite rod, the arrangement causing the shorted turn effect of the metallic waveguide to aid that magnetic field, the improvement comprising a hollow circular metallic waveguide having four inwardly extending metallic ridges dividing the interior of the waveguide into quadrants, means for supporting the centrally disposed ferrite rod upon the ridges, each quadrant having an electromagnet disposed in it adjacent the metal wall of the waveguide so that the electromagnet couples by induction to the metal wall, and the electromagnets being oriented to establish a longitudinal magnetic field through the ferrite rod.

References Cited by the Examiner

UNITED STATES PATENTS

| | | | |
|---|---|---|---|
| 2,906,974 | 9/1959 | Reggia et al. | 333—98 |
| 2,908,878 | 10/1959 | Sullivan et al. | 333—24.3 X |
| 3,072,867 | 1/1963 | Heithaus | 33—24.2 |

HERMAN KARL SAALBACH, *Primary Examiner.*

P. L. GENSLER, E. LIEBERMAN, *Examiners.*